INVENTOR.
MILTON STOLL
BY Alfred W. Barber
ATTORNEY

INVENTOR.
MILTON STOLL
BY
*Alfred W. Barber*
ATTORNEY

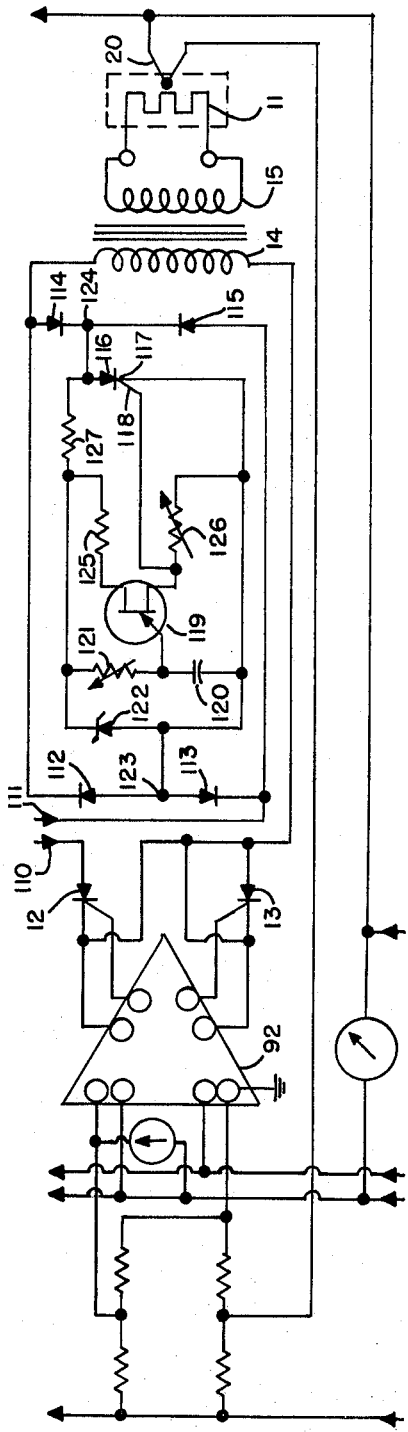
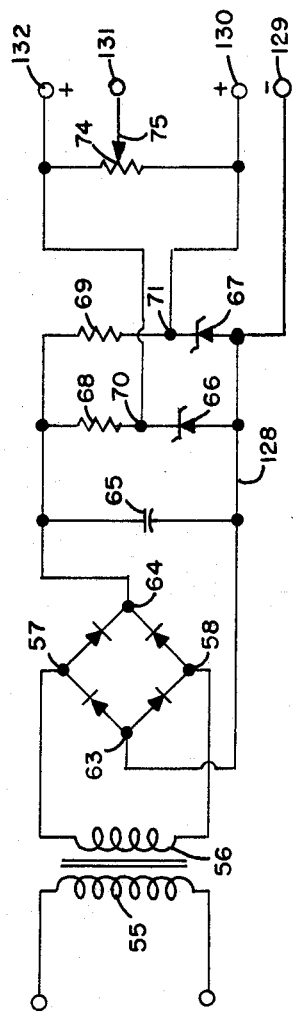
FIG 3
FIG 4
INVENTOR.
MILTON STOLL
BY Alfred W. Barber
ATTORNEY INVENTOR.
MILTON STOLL
BY
Alfred W. Barber
ATTORNEY INVENTOR.
MILTON STOLL
BY
*Alfred W. Barber*
ATTORNEY

United States Patent Office 3,479,487
Patented Nov. 18, 1969

3,479,487
TEMPERATURE CONTROLLER EMPLOYING CLOSED LOOP FEEDBACK AND INCREMENTAL PROGRAMMING
Milton Stoll, 14—19 212th St., Bayside, N.Y. 11360
Continuation-in-part of application Ser. No. 558,142, June 16, 1966. This application May 4, 1967, Ser. No. 642,627
Int. Cl. H05b 1/02
U.S. Cl. 219—494                                    20 Claims

ABSTRACT OF THE DISCLOSURE

A programmed controller means employing a closed feedback loop and an incremental programmer particularly applied to a heat sealing machine in which packages to be sealed have a complex heat profile. The temperature of the heating means, at any period in time, is sensed by a temperature responsive means and the information is fed back and compared with the programmed demand signals. The heater is than adjusted by means of the device acting to reduce the error between the demand temperature and the sensed temperature.

Cross-references to related applications

The present application is a continuation-in-part of the application of Milton Stoll entitled "Methods, Apparatus and Systems for Producing Enclosed Devices" filed June 16, 1966 and bearing Ser. No. 558,142.

Background of the invention

*Field of the invention.*—The invention is in the field of Heat Exchange (Class 257) and with Automatic Temperature or Pressure Control or Response (Sub-class 306), With Manual, Program, or Time Actuation (Sub-class 307 ) and Flow of Heat Exchanging Material Controlled by Its Own Condition (Sub-class 314).

*Description of the prior art.*—Heating profile equipment in the past has been generally limited to very slow operations. Typically a cam is cut to represent the desired heat profile and a heating means is controlled by this cam. Such systems have many limitations which have been overcome by the present invention. These limitations include slow operating rates, inflexible control, open loop operation and many more.

Summary

The present invention provides a method of and means for programming heat to a heater in accordance with a complex, flexible and predetermined profile. In order to carry out the invention a source of voltage is provided which is attenuated and programmed by means of three independent controls. One of these controls determines the maximum voltage to be provided. Another determines the minimum voltage to be provided. The third includes a stepping switch and provides timed increments of voltage lying between these maximum and minimum voltages. A thermocouple (or thermistor) is tightly thermally coupled to the heater and generates a voltage in accordance with its temperature. The thermocouple voltage is subtracted from the programmed voltage to provide a net error or difference voltage. This difference voltage is used to control electrical circuits to the heater. The sense of the difference voltage is applied to the heater circuits so that the heater operates to reduce the difference or error voltage.

This device as briefly described above may be used for many purposes but will be described here, in particular, in connection with heating parts which are to be sealed by the flow of a thermo-plastic material such as glass or solder.

The present invention concerns a device capable of rapid and repeated operation and of operation with many control circuits in parallel from a single programmer.

Particularly, the present invention provides great flexibility of the program permitting a complex temperature profile. The programmed voltage which controls the heater as set forth above is provided by a stepping switch. Each of many steps may be of equal or different increments calling for equal or different increments of heat with each step. The control of the heating may be described in terms of three distinct parts of a cycle. One part is the part or parts where temperature is increased or stepped in an upward direction. The second part is where the temperature is maintained constant or is made to dwell. The third part is where the temperature is decreased while still under control of the programmer. In addition to the stepping switch which provides predetermined increments of heat control, auxiliary control is provided which can stop the stepping switch at any predetermined step or steps and a timer or timers which determine the length of time the stepping switch is stopped on a given step. The entire rotation of the stepping switch may be used to provide the profile for increasing heat and by reversing the connections, the same number of steps with the same or different voltage increments may be used for decreasing heat back to the initial temperature. An initial voltage at the first switch position may be variably set to provide a variably determinable initial heat or temperature.

Accordingly, a primary object of the present invention is to provide a method of and means for controlling temperature in accordance with a complex and readily modified profile of temperature against time.

A further object is to provide means for controlling a heater in a closed loop feedback circuit and in accordance with a readily modified and complex time/temperature profile.

A still further object is to provide means for controlling a heater or the temperature produced by the heater as the heat is increased, decreased or held constant with time.

Another object is to provide means for controlling a heater or the temperature provided by the heater over a predetermined profile and starting at a predetermined temperature and returning to the same or a different predetermined temperature.

These and other objects of the present invention will be apparent to those skilled in the art from the detailed description of the various figures of the drawing.

In one form of the invention a heater for sealing electronic circuit packages or the like is programmed in accordance with a predetermined complex profile. The required temperature vs. time profiles is first determined. The control program or demand signals to produce this program are preset into an incremental timing controller. The temperature of the heater at any instant in time is sensed by a temperature responsive means such as a thermocouple or thermistor and the information so gained is fed back in the form of electrical signals compatible with the program demand signals. The demand signals are compared with the feedback signals to generate an error signal having a characteristic sign and a magnitude proportional to the difference between the two signals. The error signal is applied to a comparator the output of which provides a control signal heater. The temperature responsive means is connected in a sense which tends to reduce the error signal. In this way the temperature of the heater is forced to accurately follow at all times the program as dictated by the control program signals. In a typical embodiment of the present invention the program comprises 30 steps permitting programming a heating and cooling profile made up of 30 steps in the heating portion of the cycle, dwelling for predetermined periods of time at any of these 30 points and a cooling portion of the cycle which may also include dwell periods and also comprising 30 points or steps. The dwell periods referred to above, for example, may provide annealing periods for the material being heated for periods of temperature holding for some other purpose. Additional provision is made for setting a minimum or starting temperature for the heater in order to permit shortened cycles of operation.

Brief description of the drawings

FIGURE 3 is a schematic circuit diagram of a modification of a portion of the circuit shown in FIG. 2.

FIGURE 4 is a schematic circuit diagram of a modification of a portion of the circuit diagram shown in FIG. 1.

FIG. 1 is a block diagram of the electronic and electronic controls and circuits of the stepped proportional programmer together with the temperature sensing feedback circuits. The major functional components are program controller 1, stepped programmer 2, comparator and proportional controller 3 and sealer head 4, the latter including the source of the temperature sensing feedback. Other electrical and electronic components include power supply 5, reference power supply 6, temperature indicator 7 and various transformers, interconnecting lines, silicon controlled rectifiers (SCR) and switches. The AC power is supplied over lines 8–9 to programmer controller 1, reference power supply 6, DC power supply 5 and variable autotransformer 10. The main object of the system shown in FIG. 1 is to program the heat in sealer head 4 in accordance with a predetermined profile and under degenerative feedback control in part provided by a temperature sensing means incorporated in sealer head 4.

Figure 1:
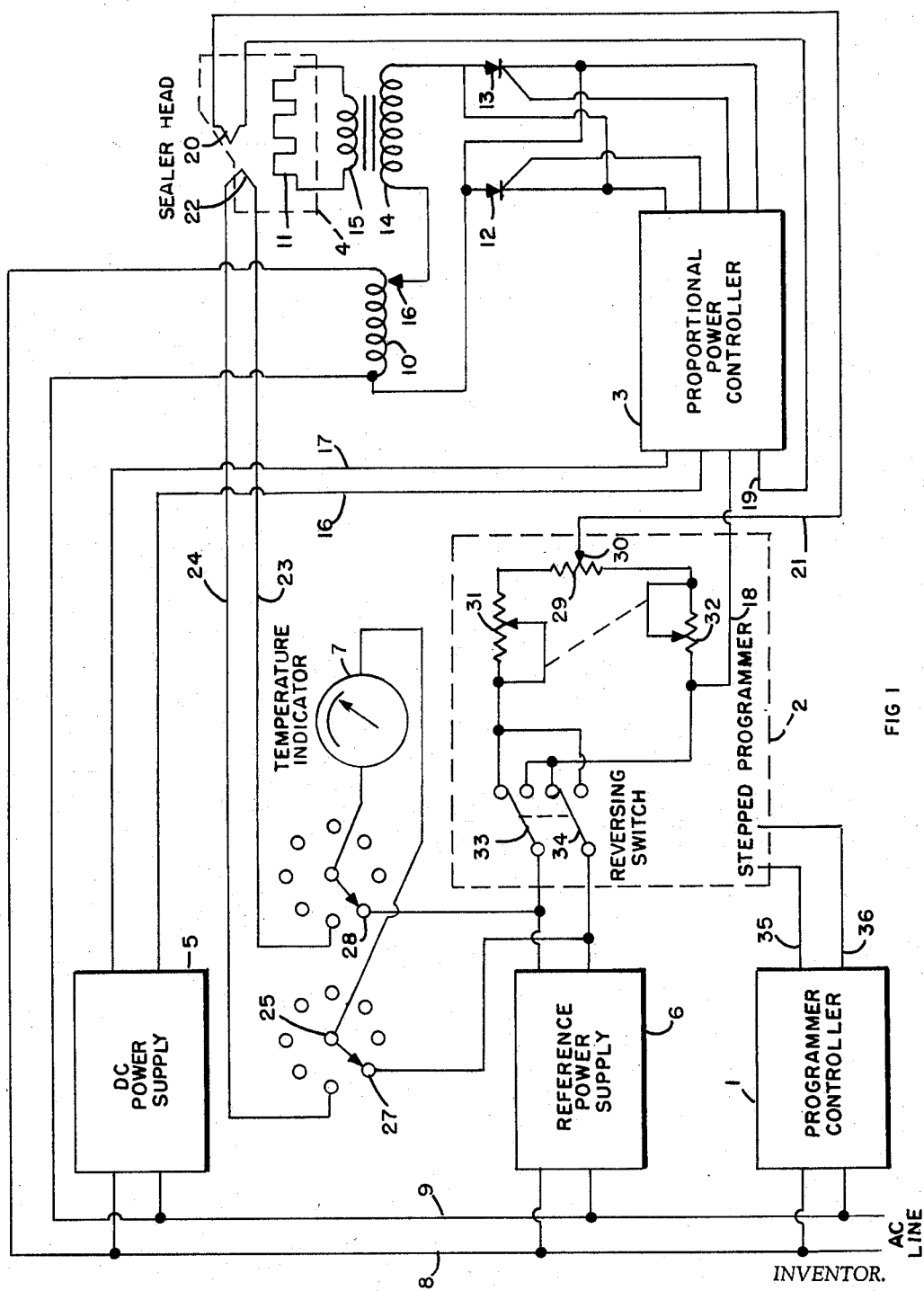
FIGURE 1 is a circuit partly in schematic and partly in block form of one form of the present invention.

The system shown in FIG. 1 programs the heat in sealer head 4. Heat is supplied to head 4 by the heater 11 which is heated by electric current from autotransformer 10 controlled by silicon controlled rectifiers 12 and 13 and through transformer 14–15 which changes the voltage selected by variable contact 16 on autotransformer 10 to a suitable voltage for application to heater 11. The current supplied to heater 11 is determined by the "on" time of silicon controlled rectifiers 12 and 13 which in turn is under control of the output of the comparator and proportional controller 3, to be described in detail below. The required DC power for comparator/controller 3 is provided by DC power supply 5 over lines 16 and 17 since comparator/controller 3 is an electronic device requiring DC power for its operation. Comparator/controller 3 is a device which can be programmed by degenerative feedback to maintain a null across its input lines 18 and 19. The input signal across input lines 18 and 19 is the difference between a programmed demand voltage provided by stepped programmer 2 and a feedback voltage across sealer head temperature responsive thermocouple 20. A demand signal from stepped programmer 2 is applied to lines 18 and 21 which causes controller 3 to turn on silicon controlled rectifiers 12 and 13 and heating heater 11. Thermocouple 20 senses the resulting temperature of sealer head 20 and feeds back a counter voltage signal over lines 19 and 21. When the feedback equals the demand signal, the head has reached the temperature predetermined by the demand signal as sensed by the comparator portion of 3 at its input and the controller 3 ceases to turn rectifiers 12 and 13 on so that no further heat is supplied to head 4. Subsequent steps of the programmer provide additional predetermined demand signals resulting in a repetition of the incremental heating of the head, feedback signal increment and turn off of the silicon controlled rectifiers when the predetermined temperatures are reached. In this way any desired temperature profile can be achieved in the head up or down only limited by the rate at which the heater can raise the head temperature and the rate at which the head can be cooled.

FIG. 1 also shows how a second thermocouple 22 may be provided in head 4 for monitoring the head temperature. The temperature sensed by thermocouple 22 is indicated on temperature indicator meter 7 to which it may be connected over lines 23 and 24 and switches 25 and 26. A more exact procedure is to measure the voltage across couple 20 as suggested by the undesignated dotted lines. Meter 7 may also be used for checking the reference supply 6 by switching switches 25 and 26 to controls 27 and 28 respectively. The stepped voltage commands are supplied by a stepped potentiometer 29–30 (here represented as a simple potentiometer) under control of stepping impulses from programmer controller 1 over lines 35 and 36 as will be described in detail below. The reference power supply 6 supplies a maximum command voltage through reversing switch 33–34 across potentiometer 29–30 through limit setting variable resistors 31 and 32. The adjustment of variable resistor 32 provides a minimum programmer output for determining the minimum programmed temperature of head 4. The adjustent of variable resistor 31 sets the maximum output voltage of the programmer and hence determines the maximum programmable temperature of head 4. The setting of contact 16 on autotransformer 16 is used to set the maximum input voltage to the heater circuit and hence is useful as a means of preventing excessive current to heater 11 in case of failure of the control circuit. While only one proportional power controller 3 and one sealer head 4 are shown, a number of sealers are generally operated from one stepped programmer by the use of a number of proportional power controllers controlling a like number of sealer heads under control of one stepped programmer. The degenerative feedback circuits of each head and controller insuring that all heads follow the same predetermined temperature profile.

It will be understood that potentiometer 29–30 may be a continuously variable resistance driven at a steady rate of rotation so that the temperature programming is a smooth variation. A straight line variation can be achieved when arm 30 is moved at a constant rate or any predetermined curve of a variation can be achieved by varying the rate of arm movement or by using a tapered potentiometer.

Figure 2:
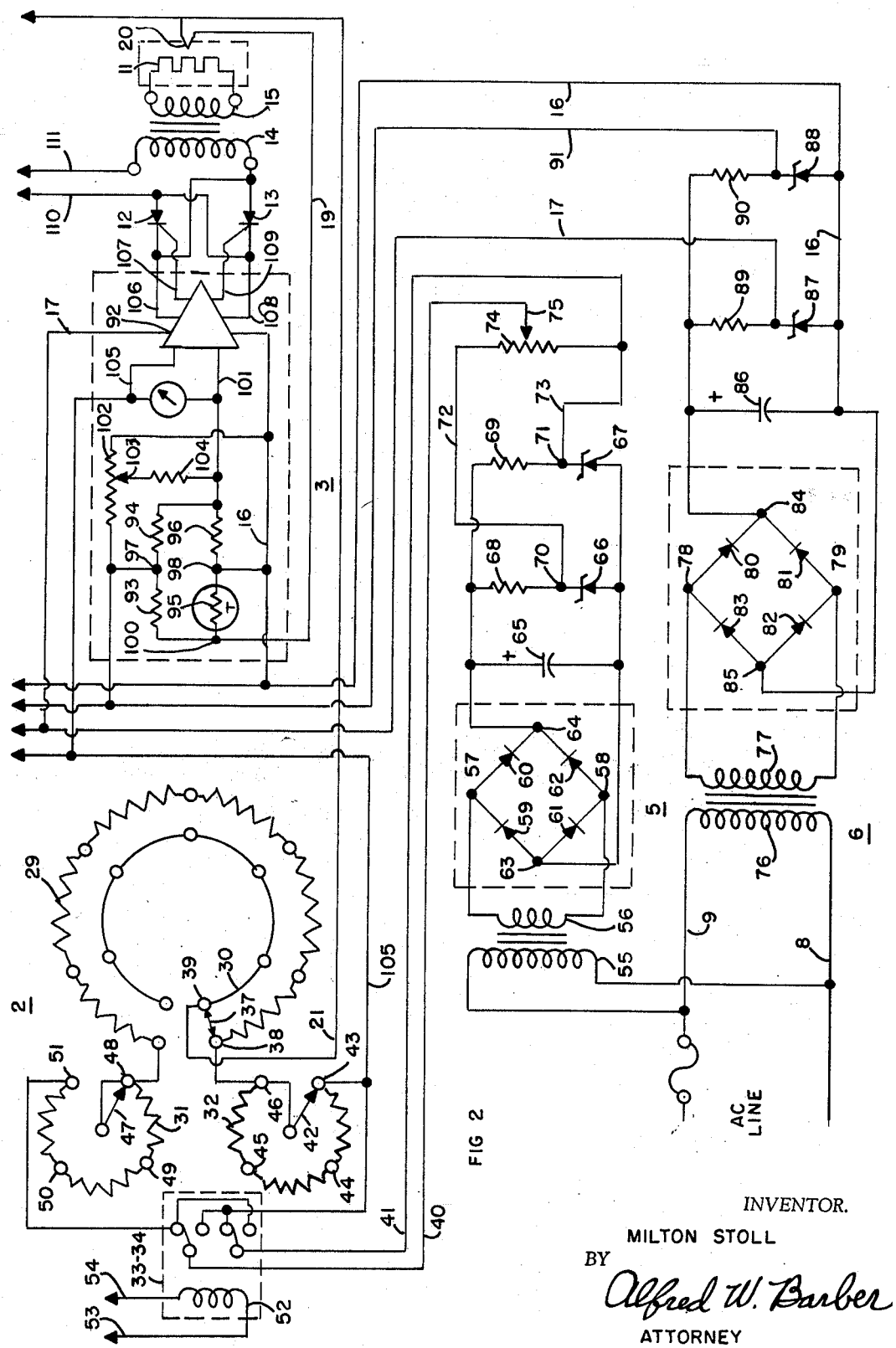
FIGURE 2 is a detailed schematic circuit diagram of a portion of the form of the invention shown in FIG. 1.

FIG. 2 is a schematic circuit diagram showing circuit details of the stepped programmer 2, proportional power controller 3 and the regulated power supplies 5 and 6 for these components of the system. While the control resistors 29–30–31–32 were shown as conventional potentiometers or rheostats in FIG. 1, they are shown in an alternate form as step switches in FIG. 2. The potentiometer 29–30 is here shown as a multipoint switch in which contactor 37 by shorting contacts such as 38–39 serves to take off over lead 21 a stepped portion of the program voltage applied through stepped rheostats 31 and 32. The input is applied over leads 40 and 41 from the reference power supply 5. With a fixed voltage applied over leads 40–41, the minimum voltage out over lead 21 is determined by the setting of contact arm 42 on contacts 43–44–45–46 of rheostat 32 and the maximum output will be determined by the setting of contact arm 47 on contacts 48–49–50–51. The double pole double throw relay 33–34 when actuated by energizing coil 52 over leads 53–54 serves to reverse the polarity of the programming voltage. Thus, if contactor 37 is rotated in one direction (by suitable means not shown), programming the control voltage which, for example, programs the heater 11 temperature upward, operating relay 52 will reverse the direction of programming to cause the heater 11 temperature to program downward.

The embodiment of the present invention as partly illustrated in FIG. 2 requires a very small program voltage essentially matching the output voltage of thermocouple 20. This very low voltage is supplied by regulated power supply 5 capable of providing regulated output voltages in the millivolt range. A typical thermocouple used in this circuit produces 1 millivolt for every 25 degrees centigrade change in temperature. Thus, a temperature range of 0 to 1000 degrees C. would produce 0 to 40 millivolts from the couple. To program this temperature range would thus require a matching programming voltage of 0 to 40 millivolts. Power supply 5 is designed to provide these programming voltages.

Continuing with the description of power supply 5, the alternating current from lines 8 and 9 is stepped down to the level of a few volts by line transformer 55–56 and the secondary voltage is applied to a bridge rectifier 59–60–61–62 across diagonal points 57–58. The rectified DC between terminals 63 and 64 is applied to filter capacitor 65. Two Zener diodes 66 and 67 are energized through dropping resistors 68 and 69 respectively providing regulated voltages at points 70 and 71. If the regulating voltage of Zener 66 is slightly higher than that of Zener 67, the voltage at point 70 will be slightly higher than the voltage at 71. For example, if the difference between the Zener voltages is the difference between 6.4 and 6.3 volts, the voltage at point 70 will be 100 millivolts higher than the voltage at point 71. Then leads 72 and 73 will apply 100 millivolts across potentiometer 74 and movable contact 75 can be varied to provide 0 to 100 millivolts across leads 40 and 41 and the stepping programmer 29–30–31–32. Thus, well regulated millivolt voltage which can be adjusted from 0 to a maximum of 100 millivolts is made available to the stepping programmer.

The second power supply 6 provides operating voltages for the power controller over leads 16, 17 and 91. A suitable stepdown line transformer 76–77 is connected between the AC line 8–9 and the diagonal points 78–79 of bridge rectifier 80–81–82–83. The rectifier between terminals 84–85 is applied to filter capacitor 86. The two voltages to be supplied are, for example, 24 and 12 volts. These voltages are regulated by the 24 volt Zener diode 87 energized through dropping resistor 89 and 12 volt Zener diode 88 energized through dropping resistor 90. Thus, the voltage on line 17 with respect to common line 16 will be 24 volts and the voltage on line 91 will be 12 volts with respect to common line 16. The regulated 24 volts on line 17 supplies operating DC voltage to the voltage comparison amplifier 92. The regulated 12 volts on line 91 supplies current to a cold junction compensating circuit consisting of a bridge composed of resistors 93, 94, 95 and 96. It has been found that if resistors 93 and 94 are substantially zero temperature coefficient resistors of 6000 ohms each, resistor 96 is a substantially zero temperature coefficient resistor of 100 ohms and resistor 95 is a temperature sensitive resistor having a temperature coefficient of per degree centigrade that when a predetermined suitable current is between diagonal points 97 and 98 that a temperature dependent small voltage will appear between diagonal points 99 and 100. The required current is supplied by potentiometer 102 connected to the 12 volt line 91 through resistor 104 connected between variable contact 103 and bridge point 99. It has been found that resistor 104 should have a value of the order of 10,000 ohms. With these connections and circuit values a voltage is produced between points 99 and 100 which is substantially equal to and tracks the cold junction voltage of the thermocouple 20 and provides a correction for the otherwise disturbing told junction voltage.

The input lines 101 and 105 to amplifier 92 serve to connect the amplifier input to a circuit comprising the output of the stepping programmer 29–30–31–32, the thermocouple 20 and the cold junction bridge diagonal points 99–100 all in series. When the voltages around this circuit add to zero, no input voltage will be applied to the input of amplifier 92. Amplifier 92 is a voltage comparison amplifier so constructed and adjusted that it produces no output across output leads 106–107 and 108–109. With no output across these leads, silicon controlled rectifiers 12 and 13 and these rectifiers are open circuited. With silicon controlled rectifiers 12 and 13 open no power is supplied from power lines 110–111 to primary 14 and hence from secondary 15 to heater 11.

In operation, stepping programmer 29–30–31–32 is advanced by a stepper, not shown, which results in a predetermined voltage output over leads 21–105 which applies a net voltage to the input to amplifier 92 which causes an output to appear across outputs 106–107 and 108–109 which in turn fires silicon controlled rectifiers 12 and 13, switching input power from lines 110–111 to primary 14 and thence from secondary 15 to heater 11. The resulting heat reaching thermocouple 20 produces a voltage which is polled to oppose the voltage from the programmer at the input to amplifier 92. When the heater temperature reaches the temperature called for by the programmer, the thermocouple voltage will balance the programmer voltage resulting in zero input to amplifier 92 which will then cease to produce output, the silicon controlled rectifiers will turn off the power to the heater. When the programmer is advanced to the next step calling for another temperature increment, the process will be repeated.

FIG. 3 is a schematic circuit diagram of a protective circuit useful as a part of the present invention. The purpose of this protective circuit is to limit the maximum power which the system can deliver to the heater 20. This protective circuit is connected in series with power line 111 and primary 14 and is so constructed that it opens the circuit in case of excess current drain to heater 11. This protective circuit uses a unijunction transistor 119 triggering silicon controlled rectifier 116–117–118 and a number of steering diodes 112, 113, 114, 115 and 122. The unijunction transistor 119 is connected to a capacitor charging circuit comprising variable resistor 121 and capacitor 120. Unijunction transistor 119 is also connected to base resistors 125 and 126 and dropping resistor 127. It will be seen that on the half cycle of the input alternating current which makes line 111 positive with respect to line 110 that current to primary 14 will flow through steering diodes 115 and 112 in a forward direction. This current will also flow through unijunction transistor base resistor 126 and in order to flow, silicon controlled rectifier 116–118 must be conducting. Zener diode 122 provides a regulated source of DC voltage to the unijunction oscillator circuit. This circuit will oscillate causing silicon controlled rectifier 116–118 to conduct until the drop in resistor 126 reaches a predetermined level sufficient to stop these oscillations. The level of voltage across resistor 126 sufficient to stop oscillations is determined by the regulated voltage across Zener diode 122 and the characteristic of unijunction transistor 119. For protecting the heater 11 this cut-off current point is chosen within the safe current range. Resistor 126 may be made variable for convenience in changing the maximum current point or level. The other half cycle of the input current which makes line 111 negative with respect to line 110 is limited in the same manner and is passed through the limiter circuit by steering diodes 113 and 114, again passing through resistor 126 and silicon controlled rectifier 116–118 in the same direction as for the half cycle first described above.

FIG. 4 is a schematic circuit of a modified form of the power supply used as a part of the present invention wherein both the required DC power supplies for both the programmer and the controller are combined in one power supply. It has been found that if the most negative voltage required is taken from line 128 at terminal 129 that two positive voltages may be taken off, one at terminal 130 and the other at terminal 132. At the same time a low fixed voltage is available between terminals 130 and 132, for example, 100 millivolts and a low value variable voltage, 0 to 100 millivolts, is available between terminals 130 and 131.

Figure 5:
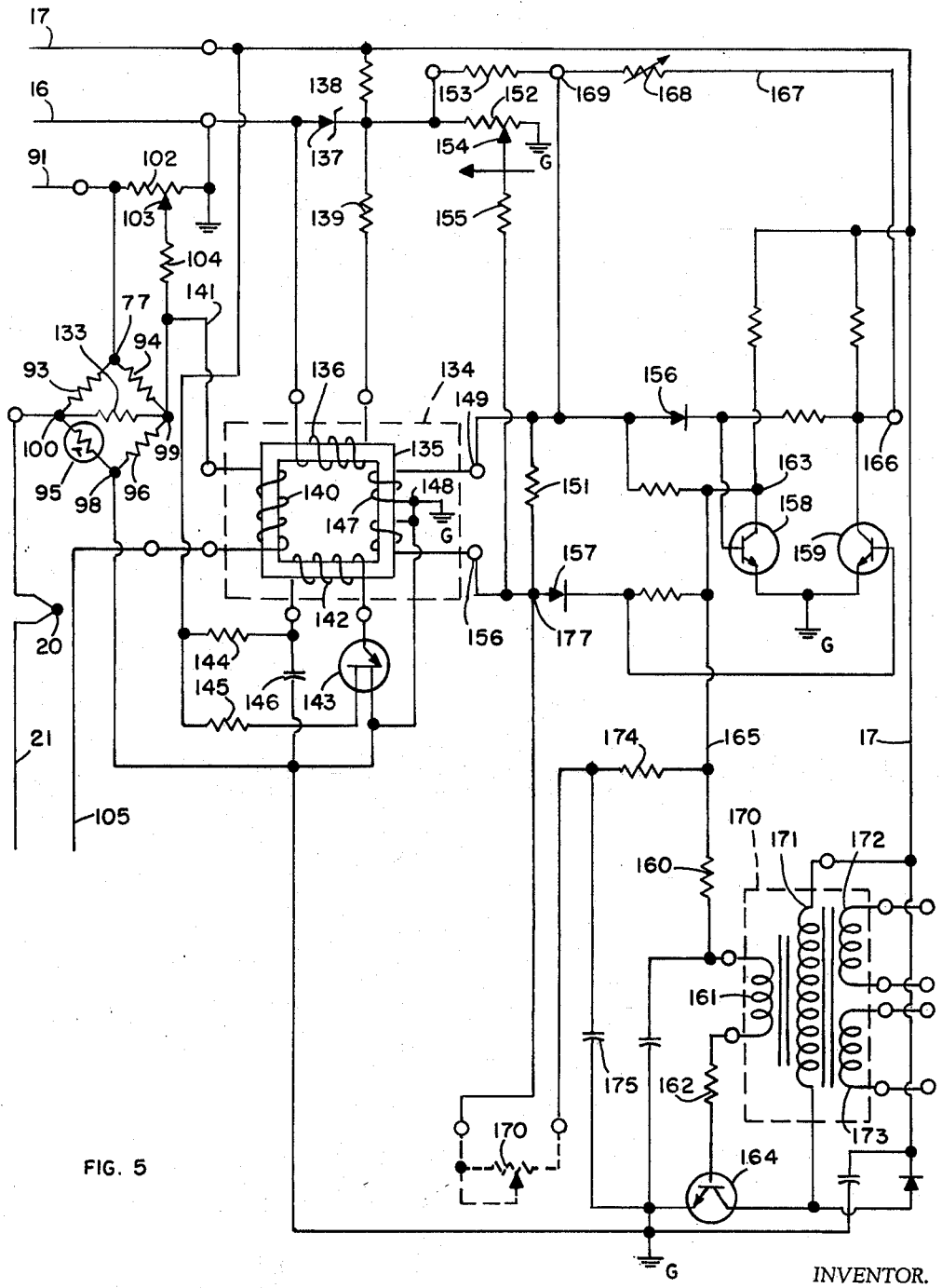
FIGURE 5 is a schematic circuit diagram of a portion of the invention represented in block form in FIG. 1.

FIG. 5 is a detailed schematic circuit diagram of a portion of the proportional power controller 3 suitable for use in the system in accordance with the present invention. The input means of the controller amplifier comprises a saturable reactor 134 having a core 135 and windings 136, 140, 142 and 147. In combination with winding 142 a unijunction transistor 143 supplied with bias through resistor 145 is connected as a relaxation oscillator with capacitor 146 charging through resistor 144 and discharging through coil 142. The frequency of this oscillator is low being of the order of 30 cycles per second. The core and coils are so placed and adapted that when a predetermined current is passed through coil 136 from the regulated voltage across Zener 137 dropping through resistor 139, the flux in core 135 due to the pulsating current in coil 142 induces balanced signals in coil 147. Any departure from this balanced condition will cause an output signal to appear across one or the other halves of coil 147 with respect to center tap 148 thereby supplying a signal to either terminal 149 or 150 which signals are utilized as described below. The unbalance which produces an output signal is derived from input signals across signal coil 140. The net input signals are produced when the net voltage around the input circuit loop is not zero as described above. Provisions have been made for balancing this circuit at some point other than zero input. This provision comprises means for passing DC bias current through one half of coil 147. A portion of the regulated voltage across Zener 137 is selected by adjustable contact 154 on potentiometer 152 and applying this selected voltage through current limiting resistor 155 to terminal 150. When this is done, the signals at terminals 149 and 150 will switch at some preselected input other than zero.

The output signals at terminals 149 and 150 are applied to rectifiers 156 and 157 respectively. Positively going pulses applied to rectifier 156 are applied to the base of transistor 158 causing it to conduct. Transistors 158 and 159 are connected as flip-flop so that conduction in one cuts off the other. Thus, either the collector of transistor 158 or 159 is highly positive while the other is clamped to ground G. Positive going pulses at terminal 150 pass through rectifier 157 to the base of transistor 159 causing it to conduct and in turn causing transistor 158 to become non-conducting. When this latter condition is produced, point 163 at the collector of transistor 158 becomes highly positive and this positive voltage is applied over lead 165, through current limiting resistor 160 coil 161 of oscillation transformer 170 and through base resistor 162 to the base of transistor 164. Transistor 164 receives collector bias through coil 171 from positive line 17 and the emitter is connected to ground G. Thus, when positive pulses appear at terminal 150 due to an unbalanced input signal across coil 140, transistor 159 conducts, transistor 158 switches off and a positive bias is supplied to the base of oscillator transistor 164 causing it to oscillate. These oscillations produce signals across output coils 172 and 173 suitable for triggering silicon controlled rectifiers. As has been set forth above the silicon controlled rectifiers (12 and 13 of FIGS. 1, 2 and 3) provide power to the heater 11. When the temperature has reached the programmed temperature, the feedback from the thermocouple again balances the input voltage to the controller, signals cease at terminal 150 and the oscillation of transistor 164 stops turning off the silicon controlled rectifiers.

The operation of the portion of the system shown in FIG. 5 as so far described is an on-off type of operation. The circuit can also be operated as a proportioning system by means of feedback from the oscillator 164–170. There are at least two feedback paths which can provide this proportioning. One comprises a path from lead 165 through resistor 174 and adjustable resistor 176 to point 177. Capacitor 175 connected from the junction between resistors 174 and 176 to ground G serves to filter the feedback pulses. As has been stated above line 165 goes positive when the system calls for heat and transistor 164 is turned on. The feedback from line 165 just described, however, causes a blocking action so that instead of supplying steady output signals to the silicon controlled rectifiers from coils 172 and 173, bursts of signals are supplied and the heating current is applied in short pulses. This heating current being much less effective than a steady heating current, heats the heaters very slowly. As the input signal across coil 140 increases, the bursts of signal become more frequent until the signals are in effect on constantly. This action from a low degree of heating power to full on is a proportioning effect which can be varied by varying resistor 176. A somewhat similar action resulting in a proportioning action can be achieved by means of a variable resistor 168 connected from terminal 166 to terminal 169 which in turn is connected to the regulated voltage across Zener 137 by means of current limiting resistor 153. The most important difference between the actions of these two alternate proportioning circuits is that one effectively increases the sensitivity of the system and the other decreases it. The second described circuit is the one which effectively decreases the sensitivity of the system and seems to be the one to be preferred for stability reasons.

Figure 6:
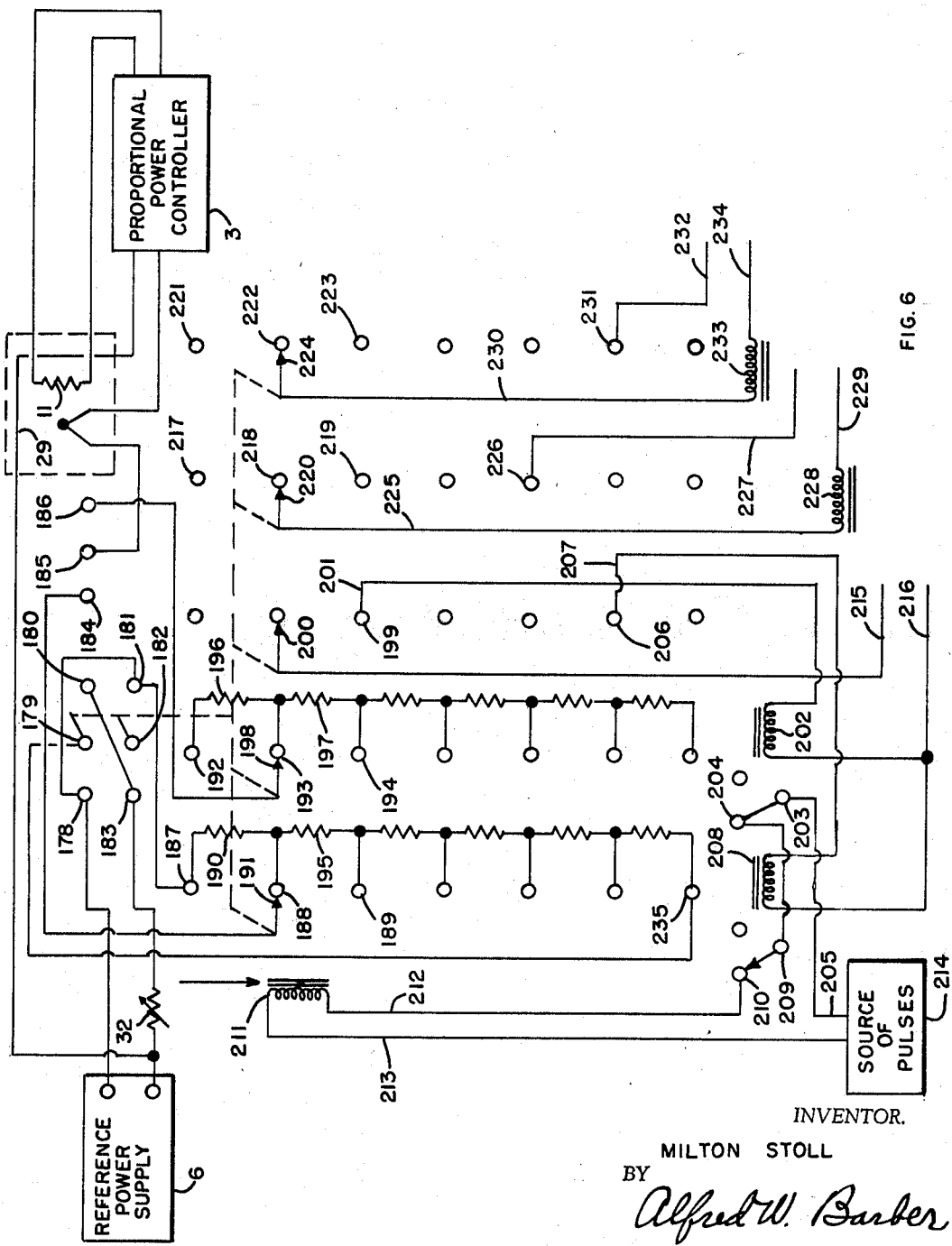
FIGURE 6 is a diagram partly schematic and partly in block form showing one arrangement of the program controlled and stepping switch in accordance with the present invention.

FIGURE 6 shows one form of stepping switch and programmer controller which may be used as a part of the present invention. The details shown here include a five deck stepping switch, two decks (187–190 and 192–198) providing programmable voltage dividers, one of which may be taken as the control for upward temperature programming and the other for downward temperature programming, a deck (199–201, 206–207) for switching in dwell timers, and the fourth (217–220) and fifth (221–224) decks available for modified programming but shown unconnected. The switching contacts 191, 198, 200, 220 and 224 are stepped by a stepping magnet 211 operating from a source of timed pulses 214 connected over leads 213 and 212 and through switches 208–210 and 203–204 and over lead 205. Opening of either of these latter switches will stop the stepping of the stepping switch by interrupting the power to magnet 211.

The voltage from the reference power supply 6 is applied through the minimum temperature voltage control resistor 32 to double pole double throw switch 178–183 at contacts 178 and 183 which are cross connected to contacts 181 and 180 respectively so that closing contacts 179 and 182 or 178 and 183 or 180 and 181 reverses the ends of voltage divider 190, 195 etc. This has the effect of causing the programming voltage to reverse direction when this switch is thrown. For example, if contact 191 is stepped from contact 187 to 188 with switch 178–183 thrown in one direction, the voltage will be programmed upward and when thrown in the other direction the voltage will be programmed downward. This is one way in which a single stepping switch can be used to provide both the upward going program and the downward going program. If the two programs are to be different switch 184–186 is thrown providing one stepping switch in one direction and the other in the other direction. The resistors 190, 195 etc. provide one program and resistors 196, 197 etc. provide the other program. The programmed voltages from the stepping switches are compared with the voltage from thermocouple 20 thermally coupled to heater 11 and the difference or error signal is applied to the input of proportional power controller 3.

In order to stop the stepping switches on a particular contact in order to cause the temperature to dwell at a predetermined point, contactor 200 provides power from lead 215 when contact 199 is reached and a circuit is closed with a suitable source of power applied to leads 215 and 216 through time delay relay or timer 202 opening contacts 203–204 and disabling stepper 211. When the end of the time delay imposed by timer 202 has been reached, switch 203–204 again closes and the stepper continues. This time delay interval may represent a dwell time and the heat control system will function to maintain a constant temperature as called for by the stepper switch position. The heat programming now continues as the stepper continues to step until contact 200 closes with contact 206 activating a second delay relay or timer 208 and opening contacts 209 and 210 disabling stepper magnet 211 which provides a second time interval of constant temperature or dwell. At the end of the dwell time the stepping continues.

Additional decks on the stepper such as those represented by contacts 217–220 and 221–224 may be provided to control auxiliary functions at any stepper point. For example, when arm 220 reaches contact 226 a circuit is closed over leads 225 and 227 which applies power from a suitable source, not shown, but over leads 227 and 229 to a solenoid 228 or other electro-mechanical device for opening a gas valve, or any function to be performed in relationship to the programming and at a particular step on the stepper. Similarly, arm 224 closes circuits through contact 231 and over leads 230, 232 and 234 to supply power to electro-mechanical device 228.

It will be understood that generally the stepper will be a rotary device although developed in linear form in FIGURE 6 to help in understanding its operation. When the stepper is a rotary device the step from the last contact as 235 in any given row will be followed by a return to the first contact as 187. In order to provide a program of increasing voltage (to control a program of increasing temperature) on the first revolution of the stepper and a program of decreasing voltage on the second revolution, the stepper deck 187, 188, 189 . . . 235 is reversed by double pole double throw reversing switch 178–183 when arm 191 passes from contact 235 to 191 so that the second revolution of the stepper has the effect of reversing the direction of voltage change with respect to progression of the stepping points. Where it is desired to have the upward going program different from the downward going program switch 184–186 can also be switched at the end of a revolution of the stepper thereby changing the program pick-off from arm 191 to arm 198. It can thus be seen that great flexibility is provided by the program controller as shown in FIGURE 6.

Figure 7:
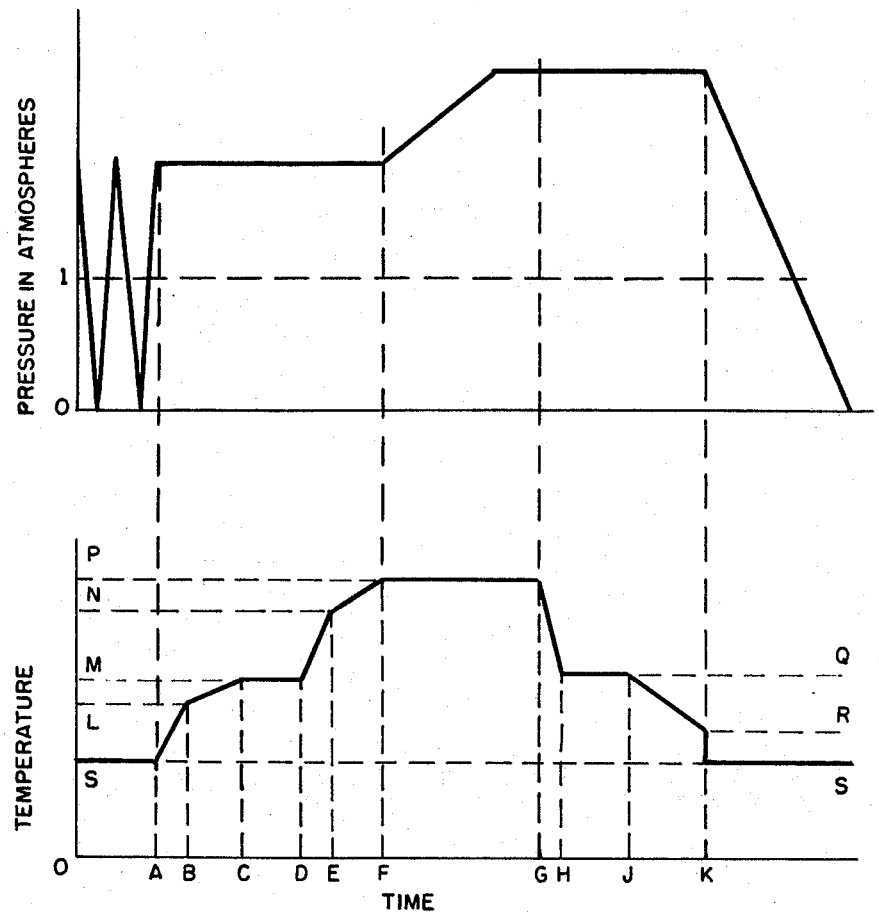
FIGURE 7 is a graphical presentation of a typical temperature/time profile provided by a system made in accordance with the present invention.

FIGURE 7 illustrates a typical temperature/time profile provided by the apparatus in accordance with the present invention. Temperature is shown vertically and time horizontally. The initial temperature at S is maintained from zero time to time A when the upward going part of the cycle starts. The first upward increment lasts from time A to time B and raises the temperature from S to L. The second upward increment at a lesser slope takes place in the time from B to C and results in temperature M. At time C a dwell period starts lasting to time D and maintaining the temperature constant at M. At time D the temperature is again programmed upward to a temperature N at time E and again upward to temperature P at a different rate to time F. At time F a second dwell period is started maintaining the temperature constant at P until time G. Starting at time G and lasting until time J. From time J until time K the temperature is programmed downward from temperature Q to temperature R. At time K the temperature is programmed downward at a maximum rate until it reaches the initial temperature S again where it is maintained until another program cycle is started. The upper graph labeled "Pressure in Atmospheres" represents one possible profile of gas pressure as controlled by the stepper and described above.

Figure 8:
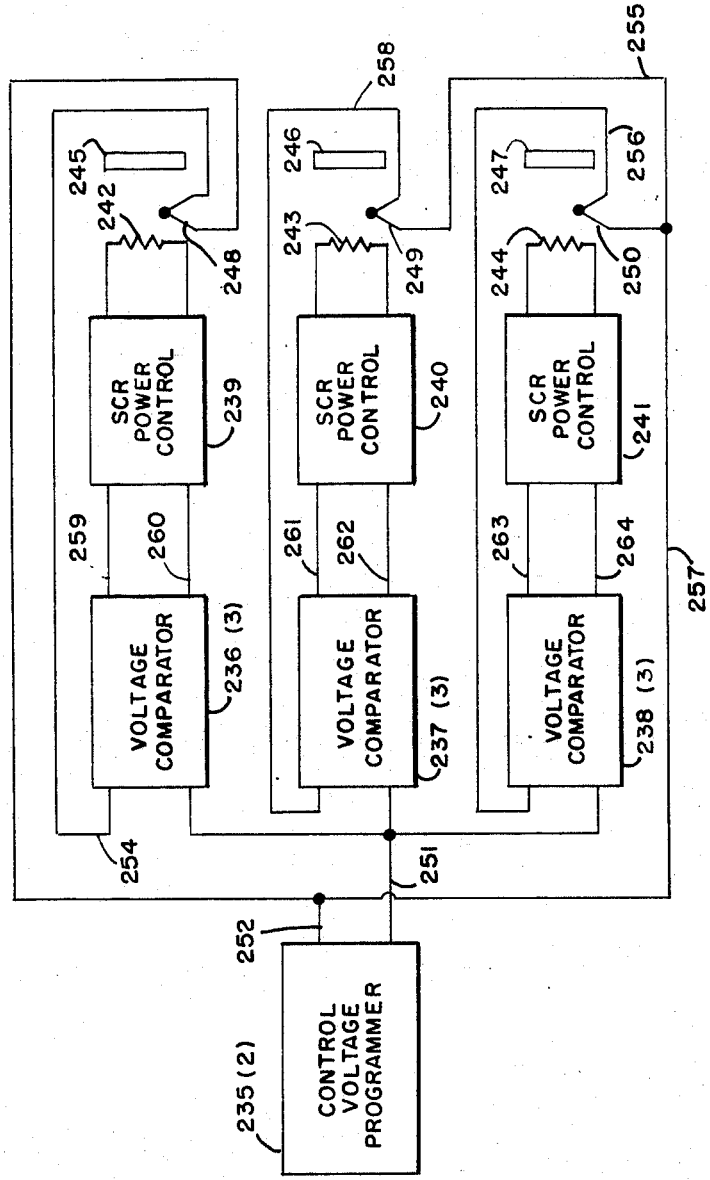
FIGURE 8 is a partly block and partly schematic circuit diagram of a program controller in accordance with the present invention illustrating how a plurality of heaters are programmed for a common control programmer.

FIG. 8 illustrates how a plurality of heaters can be controlled and programmed from a common control voltage programmer. The single control voltage programmer 235 (corresponding with control voltage programmer 2 of FIG. 1) provides a programmed output voltage over leads 251 and 252 to a plurality of power controllers 236, 237 and 238 (corresponding with power controller 3 of FIG. 1). Lead 251 may be taken as a common lead since it connects to one side of the input of each of the power controllers. Each of the power controllers drives an SCR control (239, 240 and 241) over coupling circuits 259–260, 261–262 and 263–264 respectively which may be taken to include the SCR's and transformer as shown at 12, 13, 14 and 15 in FIG. 1. The outputs of the SCR controls are connected to heaters 242, 243 and 244 respectively corresponding to heater 11 of FIG. 1. These heaters provide programmed heat independent loads represented by loads 245, 246 and 247 respectively. Between each heater and its load are located the sensing thermocouples 248, 249 and 250 respectively. Each of the thermocouples is connected in a feedback circuit between the high side 252 of the control voltage programmer 235 and one of the voltage comparator/controllers 236, 237 and 238. Specifically, one lead 253 of couple 248 is connected to the high side 252 of control voltage programmer 235 and the other lead 254 is connected to the high side of the input to power controller 236. Thus, the control voltage programmer 235 calls for a predetermined temperature; the temperature at the load 245 is sensed by thermocouple 248 and its generated voltage is fed back degeneratively to the input of power controller 236. In this way heat is supplied to load 245 by heater 242 on demand and until thermocouple 248 senses that the demanded temperature is reached. At this point the demand voltage from control voltage programmer 235 is equal and opposite to the voltage from thermocouple 248 and the power controller 236 ceases to provide an output to fire SCR control 239 and no more heat is provided by heater 242. In the same way thermocouple 249 senses the temperature at load 246 and is connected over its leads 255 and 258 between the high side of the output of control voltage programmer 235 and the high side of the input of power controller 237 to provide a degenerative feedback signal so that power is supplied to heater 243 as long as the demand signal from control voltage programmer 235 exceeds the load temperature sensing feedback signal from thermocouple 249. Load 247 is heated by heater 244 and feedback is provided by couple 250 over leads 257 and 256 to power controller 238.

It will be apparent from the above description of FIG. 8 that a plurality of loads can be heated in accordance with a predetermined program from a single control voltage programmer. Since the temperature at the load is sensed by individual temperature sensors which in turn individually control the associated heater, a plurality of loads can be heated in accordance with a common program although the response of the individual loads may vary. In other words the temperature of each load is individually controlled from a common control voltage program but with independent feedback temperature control. Thus, all loads are forced to follow the programmer demand.

The control system as specifically described as a controlled heating system may be modified to provide a control system for other physical quantities as, for example, physical pressure, light or fluid pressure in which cases the heaters and transducers would be replaced by the appropriate press and pressure transducer, light source and photo responsive means or pump and fluid flow or fluid pressure transducer. The common voltage programmer and the individual voltage comparators, transducers and transducers would be arrayed and would operate in a manner analogous to the operation of the heat controller described in detail above.

It will be understood that the above program description is intended to be merely illustrative of the type of program of which the apparatus in accordance with the present invention is capable and is intended to in no way restrict the invention to apparatus producing such a program.

I claim:

1. In a programmable temperature control system, the combination of;
   a power controller responsive to an input signal and providing output power in accordance with said input signal;
   a heater coupled to the output of said power controller;
   voltage generating means thermally closely coupled to said heater for providing a voltage dependent upon the temperature of said heater;
   a source of programmed voltage corresponding to the desired voltage contour of said voltage generating means corresponding in turn, to the desired voltage contour of said voltage generating means corresponding to the desired temperature contour of said heater;
   circuit means coupled with said source of programmed voltage and with said voltage generating means for comparing the voltage from said source of programmed voltage with the voltage from said voltage generating means and providing an output related to the difference therebetween;
   and means for coupling said output of said circuit means to the input of said power controller so that closed-loop programmed feedback control of the temperature of said heater is thereby provided;
   said source of programmed voltage comprising, in turn, a stable, fixed, low voltage reference voltage source, variable voltage divider means connected across the output of said reference voltage source and,
   means for driving said variable voltage divider to provide a preset, programmed output voltage therefrom.

2. A programmable temperature control system as set forth in claim 1,
   wherein said voltage divider means comprises a potentiometer.

3. A programmable temperature control system as set forth in claim 2,
   wherein said means for driving comprises a multi-point, multiple-deck stepping switch for controlling both the voltage program and auxiliary functions and wherein said potentiometer comprises a plurality of fixed resistances connected between adjacent switch points of said stepping switch.

4. A programmable temperature control system as set forth in claim 2,
   wherein said source of programmed voltage further comprises reversing switch means connected between said fixed voltage source and said potentiometer for reversing the plurality of the fixed reference voltage applied to said potentiometer means so that the direction of progression of the programmed voltage may be reversed.

5. A programmable temperature control system as set forth in claim 1,
   further comprising cold-junction compensating means connected in series with said voltage generating means for counteracting and compensating the cold-junction characteristics of said voltage generating means.

6. A programmable temperature control system as set forth in claim 1,
   wherein said power controller provides proportional power control of said heater and further comprising variable proportioning means connected with said proportional power controller for varying and selecting the degree of proportioning provided by said power controller.

7. A programmable temperature control system as set forth in claim 3,
   further comprising a source of pulses for activating the motor magnet of said stepping switch and means for interrupting the pulses to halt advance of said stepping switch for at least one predetermined time interval.

8. A programmable temperature control system as set forth in claim 1,
   wherein said voltage generating means comprises a thermocouple physically located between said heater and a load for said heater and in thermal contact therewith.

9. A programmable temperature control system as set forth in claim 1,
   and comprising a plurality of power controllers, voltage generating means, coupling means, heaters and circuit means electrically connected to one said source of programmed voltage for programming said plurality of heaters to follow a single temperature profile.

10. A programmable temperature control system as set forth in claim 1,
    further comprising a manually settable variable resistance coupled to said programmed voltage source for controlling the voltage range of said source.

11. A programmable power control system comprising in combination,
    a plurality of structures to have their physical condition controlled (245, 246, 247).
    individual physical condition control means coupled to each of said structures for modifying and controlling said physical condition (239–242, 240–243, 241–242),
    a physical condition to electrical voltage transducer coupled to each of said structures (248, 249, 250),
    a programmable voltage source for providing a voltage signal profile corresponding to the desired voltage output profile of said transducer (235),
    a plurality of voltage comparator means each comprising a plurality of input means and output means for providing output signals in response to predetermined relationship of input voltages applied to said input means (236, 237, 238),
    a plurality of input coupling means each extending between said voltage source and an input of one of said comparators and a plurality of feedback coupling means each extending between one of said transducers and another input of said one of said comparators to enable each comparator to provide an output signal in accordance with the demand of said programmable voltage source and the voltage from the respective individual transducer (253–254, 255–258, 256–257),
    a plurality of output coupling means each extending between the output of an individual comparator and the physical condition control means coupled to the individual structures corresponding to the respective transducer coupled to said individual comparator input (259–260, 261–262, 263–264),
    so that said programmable voltage source controls a plurality of feedback controlled physical impressions in accordance with the individual response of a plurality of such structures.

12. A programmable control system as set forth in claim 11, wherein at least one of said voltage comparator means comprises a magnetic amplifier.

13. A programmable control system as set forth in claim 11, wherein at least one of said physical condition control means comprises a silicon control rectifier and an electrical heater.

14. A programmable voltage system set forth in claim 11, wherein at least one of said voltage transducers comprise a thermocouple.

15. A programmable power control system comprising, in combination,
a structure to have its physical condition controlled,
physical condition control means coupled to said structure for modifying and controlling said physical condition,
a physical condition to electrical voltage transducer coupled to said structure,
a programmable voltage source for providing a voltage signal profile corresponding to the desired voltage output profile of said transducer, a voltage comparator comprising a plurality of input means and output means for providing output signals in response to predetermined voltage relationships applied to said input means,
input coupling means extending between said voltage source and an input of said comparator,
feedback coupling means extending between said transducer and another input of said comparator, and
output coupling means extending between the output of said comparator and the physical condition control means to enable said comparator to provide an output signal in accordance with the demand of said programmable voltage source and the voltage of said transducers and feedback control of the physical condition in accordance with the desired profile of said structure, and wherein said programmable voltage source comprises, in turn,
a fixed reference voltage source and programmable attenuation means connected with said fixed voltage source for providing a programmable voltage output therefrom.

16. Programmable voltage system defined in claim 15 wherein said programmable attenuation means comprises a voltage divider having a movable tap and means for moving said tap relative to said voltage divider.

17. Programmable control system defined in claim 16 wherein said voltage divider comprises a resistant potentiometer.

18. Programmable control system defined in claim 16 wherein said means for moving comprises a multi-point stepping switch and wherein said voltage divider comprises a plurality of fixed resistances connected between adjacent switch points of said stepping switch.

19. Programmable control system defined in claim 18 further comprising a source of pulses for activating the motor magnet of said stepping switch and means for interrupting the pulses to halt advance of said stepping switch for at least one predetermined time interval.

20. Programmable control system defined in claim 18 wherein said stepping switch comprises a multi-level switch for providing said programmable voltage source and control of auxiliary process operations.

References Cited

UNITED STATES PATENTS

| | | | |
|---|---|---|---|
| 3,060,299 | 10/1962 | Morgan | 219—494 |
| 3,315,063 | 4/1967 | Ihlenfeldt | 219—497 |
| 3,371,191 | 2/1968 | Seney | 219—497 |

BERNARD A. GILHEANY, Primary Examiner

F. E. BELL, Assistant Examiner

U.S. Cl. X.R.

307—116